(12) United States Patent
Tardy-Tuch et al.

(10) Patent No.: US 11,312,377 B2
(45) Date of Patent: Apr. 26, 2022

(54) METHOD FOR AUTONOMOUS DRIVING OF A VEHICLE

(71) Applicant: Dr. Ing. h.c. F. Porsche Aktiengesellschaft, Stuttgart (DE)

(72) Inventors: Georg Tardy-Tuch, Unterreichenbach-Kapfenhardt (DE); Florian Strecker, Weissach (DE); Michael Glatz, Weinsberg-Gellmersbach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 92 days.

(21) Appl. No.: 16/984,307

(22) Filed: Aug. 4, 2020

(65) Prior Publication Data
US 2021/0070290 A1 Mar. 11, 2021

(30) Foreign Application Priority Data
Sep. 5, 2019 (DE) ...................... 10 2019 123 899.4

(51) Int. Cl.
*B60W 30/12* (2020.01)
*B60W 30/18* (2012.01)

(52) U.S. Cl.
CPC ...... *B60W 30/12* (2013.01); *B60W 30/18145* (2013.01); *B60W 2552/05* (2020.02); *B60W 2552/30* (2020.02); *B60W 2552/50* (2020.02); *B60W 2554/60* (2020.02)

(58) Field of Classification Search
None
See application file for complete search history.

(56) References Cited

U.S. PATENT DOCUMENTS

| | | | |
|---|---|---|---|
| 2015/0345959 A1* | 12/2015 | Meuleau | G05D 1/0217 701/23 |
| 2017/0045418 A1* | 2/2017 | Peperhowe | G06F 30/20 |
| 2018/0099667 A1* | 4/2018 | Abe | B60W 30/025 |

(Continued)

FOREIGN PATENT DOCUMENTS

| | | |
|---|---|---|
| EP | 3517893 A1 | 7/2019 |
| WO | 2017183486 A1 | 10/2017 |

OTHER PUBLICATIONS

Galiläer, Trassierung von Straßenverkehrsanlagen mit der Finiten-Elemlente-Methode: Hochschulschrift: Dresden Techn. Univ Disseration with partial translation, 2010, 158 pages.

*Primary Examiner* — David P. Merlino
(74) *Attorney, Agent, or Firm* — RatnerPrestia

(57) ABSTRACT

Method and device for autonomous driving of a vehicle on a roadway in a direction of travel. A trajectory for driving on the roadway in the direction of travel is determined. A bending strip of limited length defines the trajectory, wherein the bending strip is fixed at one end thereof in a node which defines a starting point of the trajectory. A course of the trajectory is determined, starting from the starting point, in dependence on a bending line of the bending strip, which line extends, starting from the node, to the other end of the bending strip. A representation of a roadway boundary defines a boundary condition for the determination of the trajectory. A quality measure is defined in dependence on a property of the bending strip. The bending line which satisfies the boundary condition and for which the quality measure has an extremal value is determined.

11 Claims, 3 Drawing Sheets

(56) References Cited

U.S. PATENT DOCUMENTS

2019/0086925 A1\* 3/2019 Fan ................... B60W 30/00
2019/0235516 A1\* 8/2019 Zhang .............. G08G 1/096725
2020/0377087 A1\* 12/2020 Chen ................. G06K 9/00798

\* cited by examiner

METHOD FOR AUTONOMOUS DRIVING OF A VEHICLE

CROSS-REFERENCE TO RELATED APPLICATION

This application claims priority to German Patent Application No. 10 2019 123 899.4, filed Sep. 5, 2019, the content of such application being incorporated by reference herein in its entirety.

FIELD OF THE INVENTION

The invention relates to a method and a device for autonomous driving of a vehicle.

BACKGROUND OF THE INVENTION

US 2018/0099667 A1, which is incorporated by reference herein, discloses the control of an autonomous vehicle, wherein left and right boundary lines of a roadway on which the vehicle is traveling are calculated. Moreover, an ideal travel route running within a range of the left and right boundary lines is determined, minimizing a travel distance and minimizing a deviation from a center line.

WO 2017/183486 A1, which is incorporated by reference herein, discloses a method for generating a trajectory for an autonomous vehicle, taking into account the acceleration and braking of the vehicle, thus ensuring that smooth driving is achieved. For this purpose, a trajectory is generated, having an inflection point in a curvature change section, in which the curvature changes monotonically in relation to the travel distance of the vehicle.

SUMMARY OF THE INVENTION

It is desirable to provide a method, improved in comparison therewith, and a device, improved in comparison therewith, for autonomous driving.

The method for autonomous driving of a vehicle on a roadway in a direction of travel envisages that a trajectory for driving on the roadway in the direction of travel is determined, wherein a bending strip of limited length defines the trajectory, wherein the bending strip is fixed at one end thereof in a node which defines a starting point of the trajectory, wherein a course of the trajectory is determined, starting from the starting point, in dependence on a bending line of the bending strip, which line extends, starting from the node, to the other end of the bending strip, wherein a representation of a roadway boundary defines a boundary condition for the determination of the trajectory, wherein a quality measure is defined in dependence on a property of the bending strip, in particular a bending stiffness, a tension or centering of the bending strip with respect to the representation of the roadway boundary, wherein the bending line which satisfies the boundary condition and for which the quality measure has an extremal value is determined, in particular by the principle of virtual displacement, preferably by means of the finite element method. The result is then a trajectory which optimally satisfies the set boundary condition in accordance with the quality measure. By way of example, the representation of the roadway boundary defines a corridor in which a usable roadway lies and in which the trajectory must lie. The bending stiffness in the quality measure is used, for example, to specify physiological or driving-related physical variables such as yaw acceleration or lateral acceleration or a change in this acceleration. The quality measure can also be configured for the determination of a fastest and/or shortest route or of a minimal acceleration. The quality measure is defined as a mean squared error, for example. In this case, the extremal value is defined as the minimum of the quality measure. The trajectory calculation is performed by means of a model which has a directly controllable mathematically biunique behavior. The model takes into account the physiological and driving-related physical variables and can be adapted to a driving style. In one aspect, the calculation is performed adaptively, on the basis of the current driving state. In one aspect, the calculation is provided in real time, i.e. during driving. In one aspect, the problem of optimization with the quality measure and the boundary conditions is formulated in a mathematically unique way and is minimized by the principle of virtual displacement, preferably by means of the finite element method. The calculation delivers a reproducible, mathematically verifiable trajectory calculation. It is thus possible to establish verifiability of the behavior.

The quality measure is preferably defined by a curvature of the bending line, wherein the bending line of which the curvature is minimal, is determined. Thus, the roadway with the lowest energy level is followed.

A section of the trajectory for driving in a segment of the roadway which extends in the direction of travel is preferably determined, wherein the section is bounded by a section start and a section end, wherein the section start and the section end are defined by nodes of the bending strip which a discrete element of the bending strip connects, wherein a course of the section is determined in dependence on a bending line of the discrete element, wherein a quality measure for the discrete element is defined in dependence on a property of the discrete element, in particular a bending stiffness, a tension or centering of the discrete element in respect of the representation of the roadway boundary, wherein the bending line for which the quality measure for the discrete element has an extremal value is determined, in particular by the principle of virtual displacement, preferably by means of the finite element method. This allows segment-by-segment determination of the sections for the trajectory. The use of the segments allows an overall consideration of a driving segment. The trajectory calculation plans the trajectory in advance in a feedforward control process by means of the segments. As a result, events at the end of the segment considered have retroactive effects on the start of the segment.

The discrete element is preferably defined as a rod-type bar. This allows particularly efficient trajectory calculation by finite element methods. In this aspect, the trajectory is represented by rod-type bars which are lined up as discrete elements between nodes within the corridor. Nodes at both ends of the rod-type bar define the section start and the section end. In this aspect, the bending line and the position of the nodes are determined in such a way by varying the bending line and the position of the nodes in accordance with the principle of virtual displacement, preferably by means of the finite element method, that they lie within the corridor. As a boundary condition, use is made, for example, of a contact calculation to exclude bending lines for which there is contact between the trajectory and the roadway boundary.

The boundary condition preferably defines a respective node for the section start and the section end, said nodes representing a point on or within the roadway boundary on a line perpendicular to a median strip of the roadway. Boundary conditions that are to be precisely maintained are thus defined.

The boundary condition preferably defines at least one property for an element stiffness for the bending strip or a discrete element of the bending strip. In this way, the physiological and driving-related boundary conditions are modeled particularly well.

Provision is preferably made for an additional spring element to be defined for the bending strip or a discrete element of the bending strip, said spring element engaging on a node for the bending strip or for the discrete element, wherein the boundary condition defines at least one property of the additional spring element. The spring elements are penalty elements, which allow definition of violable boundary conditions.

Provision is preferably made for the calculation of the trajectory to be started in dependence on a position of the vehicle, in particular with respect to a previously determined trajectory, or under time control. Initial or iterative repeated calculation of the trajectory during driving can thereby be controlled in real time.

Provision is preferably made for the extremal value to be a minimal value, wherein the minimal value is defined in dependence on at least one parameter, which defines a property of the bending strip or of a discrete element of the bending strip in dependence on an acceleration and/or deceleration behavior of the vehicle, wherein a multiplicity of minimal values for different parameters is determined, wherein the trajectory is determined in dependence on the parameter which defines the smallest minimal value of the multiplicity of minimal values. A nonlinear model behavior occurring due to different properties of the bending strip is thereby represented.

A device for autonomous driving for a vehicle provides for the device to comprise a processing unit which is designed to carry out the method.

BRIEF DESCRIPTION OF THE DRAWING FIGURES

Further advantageous embodiments will become apparent from the following description and the drawing. In the drawing.

DETAILED DESCRIPTION OF THE INVENTION

Trajectory planning is becoming increasingly significant with the increasing degree of automation in motor vehicles. Through the development of algorithms and sensors, the operating state and environmental conditions of the vehicle are becoming known with increasing accuracy, and guidance tasks are increasingly being taken over by the vehicle itself.

Trajectory planning is required both for safety functions and for comfort functions, such as highway pilot. Trajectory planning concerns, for example, avoidance or early intervention by the safety function if a section in front of the vehicle can only be traversed at limit values from the current driving state. This relates to comfort functions such as highway pilot, traffic jam pilot, or other functions for general autonomous driving, for example.

The aim of the concept under consideration is to provide a method for autonomous driving by means of which it is not only possible to calculate a general trajectory but which also allows targeted, selective, section-by-section influencing of trajectory characteristics based on the current driving state. This expands traditional methods, e.g. methods which use polylines or spline fitting to selectively incorporate the possibility of vehicle-specific features into the calculation.

These vehicle-specific features may be features for marque-typical driving but also features associated with kinetosis or energy consumption, for example. The trajectory can be influenced in dependence on transverse properties of the vehicle. It is also possible for the trajectory to be modeled in an optimized way in dependence on the driving situation or for braking into a bend or accelerating out of the bend.

Figure 1:
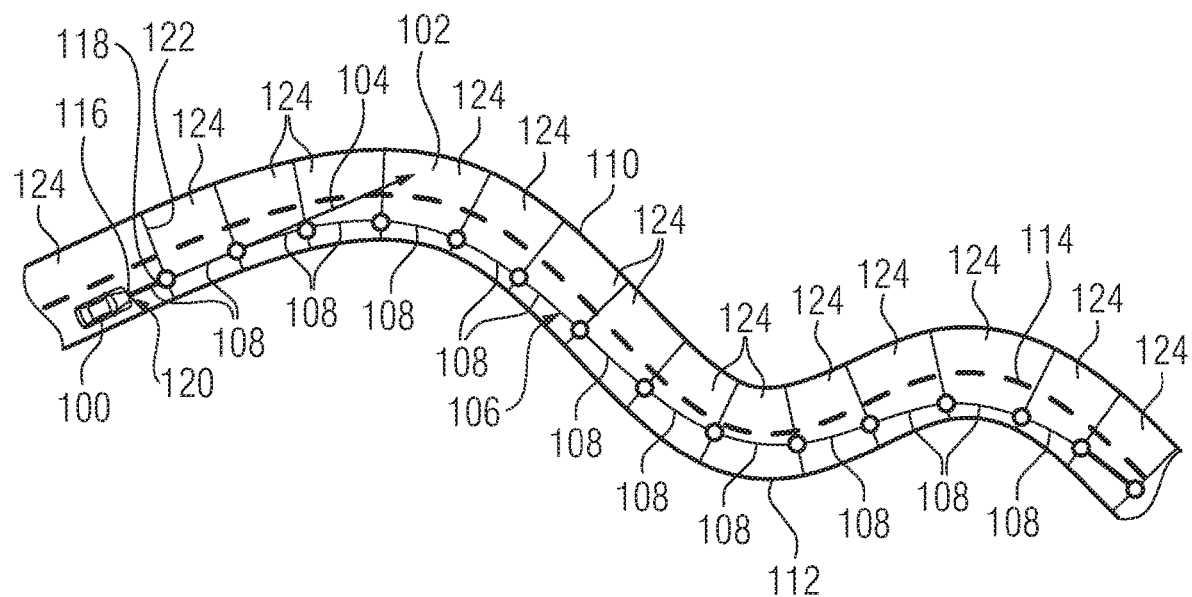
FIG. 1 shows a schematic illustration of a trajectory and of a roadway.

FIG. 1 is a schematic illustration of a roadway 102 for autonomous driving of a vehicle 100. In the example, the vehicle 100 is moving forward in a direction of travel 104. A trajectory 106 for driving on the roadway 102 is illustrated in FIG. 1. The trajectory 106 is one of a multiplicity of possible trajectories along which the vehicle 100 can be moved on the roadway 102. In the example, the tangent to the trajectory 106 indicates the direction of travel 104.

In the example, the trajectory 106 is divided into sections 108. The roadway 102 is bounded by a roadway boundary. In the example, a left-hand lateral boundary 110 arranged to the left of the trajectory in relation to the direction of travel 104, and a right-hand lateral boundary 112 arranged to the right of the trajectory in relation to the direction of travel 104 are illustrated. In the example, a median strip 114 runs centrally relative to the lateral boundaries. The roadway boundary can optionally be defined by the lateral boundaries or by the median strip and one of the lateral boundaries.

Each section 108 is delimited by a section start and a section end. FIG. 1 illustrates the section start 116 and the section end 118 of the section 108 starting directly in front of the vehicle 100. The section start of the section 108 adjoining said section 108 is the section end 118. The following sections 108 are arranged in a corresponding sequence.

For the sake of clarity, the section start and the section end of these sections 108 are illustrated as points and are not denoted by reference signs. The section start 116 is also the starting point 120 of the trajectory.

In the example, the section start 116 and the section end 118 each lie on a line perpendicular to the median strip 114. A perpendicular line 122 is illustrated for the section end 118 in FIG. 1. A multiplicity of these perpendicular lines divide the roadway 102 into segments 124.

Figure 2:
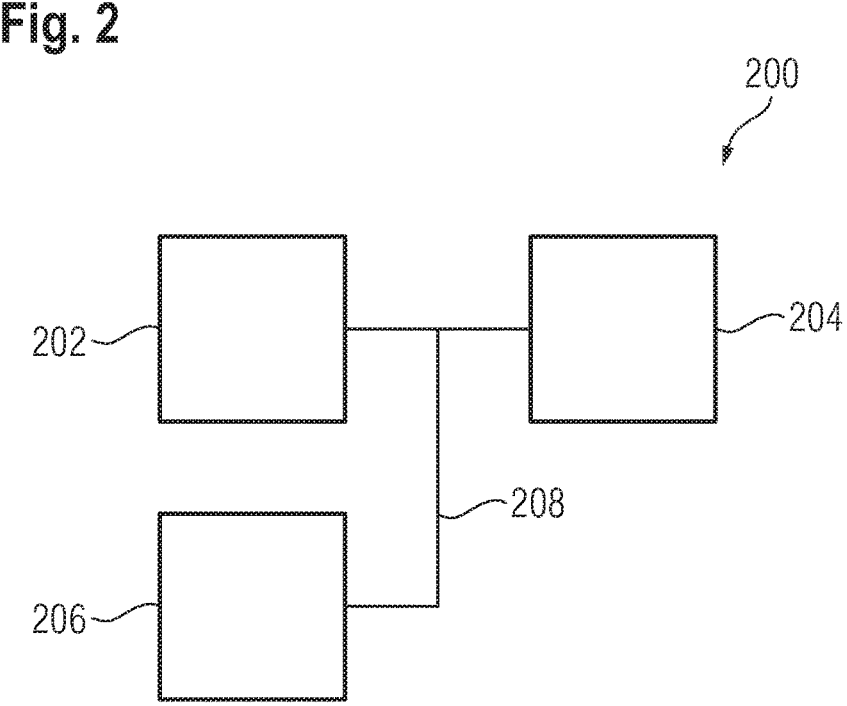
FIG. 2 shows a schematic illustration of parts of a device for autonomous driving.
Figure 4:
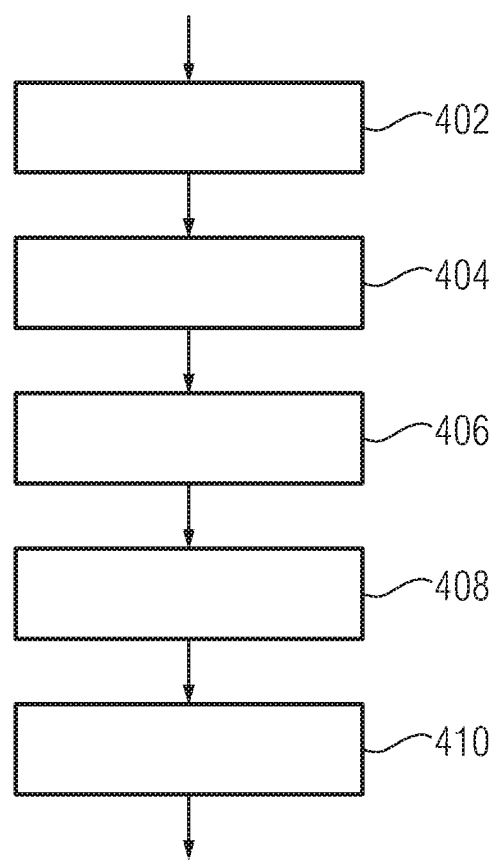
FIG. 4 shows steps in a method for autonomous driving.

FIG. 2 illustrates a device 200 for autonomous driving. The device 200 comprises a processing unit 202, a detection unit 204 and an actuating unit 206, which are connected via a data line 208 and are designed to interact in order to carry out a method described below with reference to FIG. 4. The processing unit 202 is a microprocessor, for example. The actuating unit 206 is designed to specify a direction of travel for the vehicle 100 in accordance with the trajectory 106, or to steer the vehicle 100 in this direction of travel. The detection unit is designed to acquire and supply information on the roadway 102 and/or the roadway boundary.

Figure 3A:
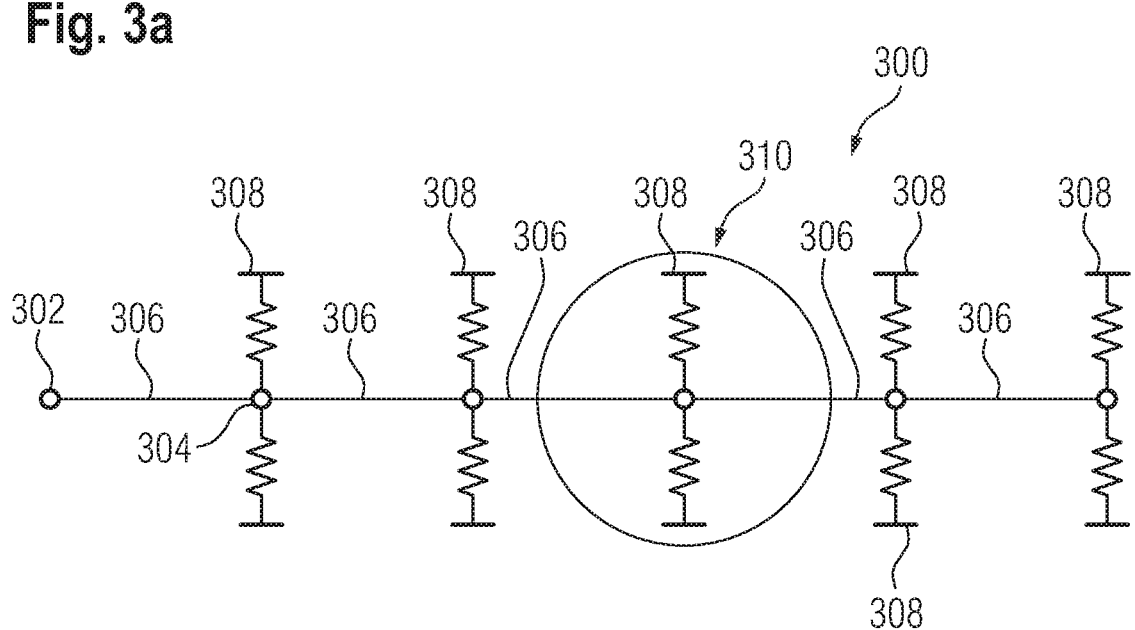
FIGS. 3a and 3b show details of a model of a bending strip.

For the method, the trajectory is modeled by a bending strip 300, which is illustrated schematically in FIG. 3a. In this example, nodes of the bending strip 300 model the section start and section end. FIG. 3a illustrates a node 302 for the section start 116 and a node 304 for the section end 118. Discrete elements 306 arranged between nodes model the sections 108 from FIG. 1. In the example illustrated in FIG. 3a, a bending stiffness is illustrated by a spring element 308 at the node. In addition or as an alternative, a bending stiffness can be modeled in the discrete elements 306.

Figure 3B:
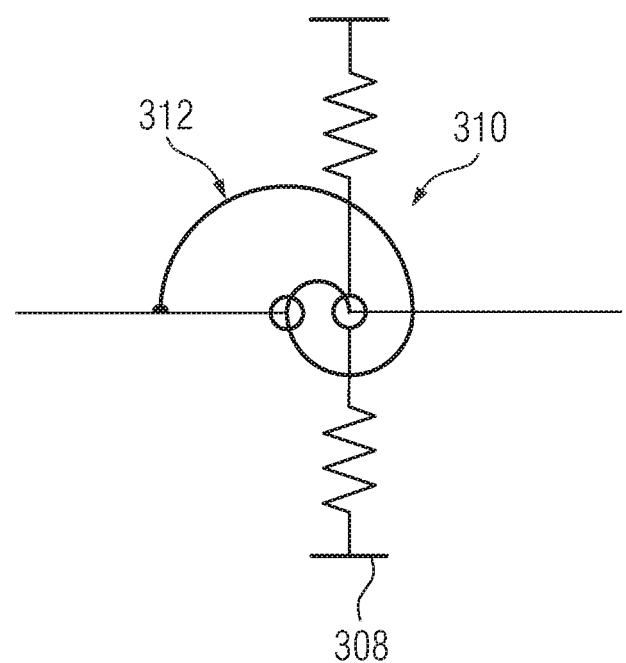

FIG. 3b illustrates a detail view of a node 310 from FIG. 3a. In the example, an additional spring element 312 is used for the node 310 to model a tensile stiffness, in addition to the bending stiffness.

These additional spring elements 312 can be defined for the bending strip 300 or the discrete elements 306 of the bending strip 300. A spring element 312 engages on one node for the bending strip 300 or for the discrete element. The other nodes of the bending strip 300 can likewise be modeled.

The element stiffness for the bending strip 300 or a discrete element 306 of the bending strip 300 can be modeled and adjusted by means of these spring elements.

In the example, the bending strip 300 is modeled as a virtual numerical bending strip with properties which can be defined by the bending stiffness and/or tensile stiffness, the tension.

In the aspect illustrated in the example, the bending strip 300 comprises an equidistant sequence of discrete elements 306. In the example, the discrete elements 306 are defined as rod-type bars of the same length. It is not necessary to employ an equidistant sequence of discrete elements 306; on the contrary, the length of the discrete elements 306 may vary.

Since, in this aspect, the bending strip 300 is composed of individual discrete elements 306 with individually adaptable stiffness, the bending line can be changed element-by-element by changing the element properties. The local curvature can be reduced, for example, by increasing the stiffness in the corresponding discrete elements 306. A change in the trajectory 106 is thereby possible. It is thus possible to set a different driving behavior selectively and even locally.

The method is suitable for keeping down an initial computing effort for trajectory calculation and for responding flexibly to deviations from the calculated trajectory. In particular, it is only a relevant region in front of the vehicle 100, not an entire trajectory, which is calculated for a route from the start to the destination of the route.

This region represents a calculation horizon, which is calculated continuously in one aspect.

In another aspect, the calculation horizon is shifted segment-by-segment. For this purpose, the discrete element 306 for a segment which has just been traversed is removed and a new discrete segment 306 for a segment at the end of the trajectory is added to the other end of the bending strip 300 at the vehicle end of the bending strip 300. This procedure is more efficient than continuous calculation.

In the example, the method starts when the calculation of the trajectory 106 is initiated in dependence on a position of the vehicle 100, in particular with respect to a previously determined trajectory, or under time control. In the calculation, a virtual numerical representation of the bending strip 300 and a virtual numerical representation of the roadway boundary that have been defined as described above in dependence on the real conditions are used. These are referred to below as a bending strip and a roadway boundary.

After the start of the method, a step 402 is carried out.

In step 402, the quality measure for the calculation is determined in dependence on a desired behavior of the vehicle 100. Moreover, the boundary condition for the calculation is determined in dependence on information on the roadway 102 or the desired driving behavior.

For example, the quality measure is defined in such a way that the energy consumption is minimized if the quality measure has the extremal value. In the example, the quality measure is defined by the properties of the bending strip, in particular the bending stiffness, the tension or by centering of the bending strip with respect to the roadway boundary.

For example, the roadway boundary is determined in dependence on the course of the left-hand sideline 110, the right-hand sideline 112 and/or the course of the median strip 114. In the example, the boundary condition defines a bending line, i.e. the course of the bending strip, and therefore the trajectory 106 runs within the roadway boundary defined by the median strip 114 and the right-hand side strip 112. This corresponds to a bending line of the virtual numerical bending strip within the roadway boundary.

The quality measure is defined by a curvature of the bending line, for example.

The boundary condition can define a respective node for the section start and the section end, said nodes representing a point on or within the roadway boundary on a line 122 perpendicular to the median strip 114. The bending strip can also be inserted without a subdivision corresponding to the sections. The boundary condition can comprise a contact calculation by means of which a bending line of the bending strip during travel is determined in such a way that the trajectory 106 is held geometrically within the roadway boundary. It is possible to provide centering, which, when defined as a boundary condition, positions the vehicle 100 within the roadway boundary, even in the case of no contact between the trajectory 106 and the roadway boundary.

The boundary condition can define at least one property for an element stiffness for a spring element 308 of the bending strip or for a discrete element 306 of the bending strip in dependence on desired physiological and/or driving-related physical boundary conditions.

In the case where an additional spring element 312 is provided, the boundary condition defines at least one property of the additional spring element 312. In this way, penalty elements which allow violable boundary conditions are modeled.

In a step 404, the course of the virtual numerical bending strip, due to the course of which the trajectory 106 ahead of the vehicle 100 runs within the roadway boundary in the roadway 102 and due to which the quality measure has the extremal value, is then determined for the calculation of the trajectory 106. For this purpose, the bending line of the bending strip constructed from discrete elements in a manner similar to the finite element method is calculated in such a way in accordance with the principle of virtual displacements that the bending line runs in a virtual numerical representation of the roadway boundary. This means that the bending line is determined in such a way in dependence on the quality measure that the boundary condition is satisfied and the quality measure has the external value.

The bending strip is of limited length and defines the trajectory 106. The length and course of the bending line of the bending strip correspond to the length and course of the trajectory 106.

For the calculation, the bending strip is fixed at one end, which defines the starting point 120 of the trajectory 106. Starting from the starting point 120, the course of the trajectory 106 is determined in dependence on the bending line of the bending strip. The bending line extends from this node to the other end of the bending strip.

A step 406 is then carried out.

In step 406, the trajectory 106 is determined in dependence on the bending line. In the example, the trajectory 106 which runs along the bending line is determined.

If the quality measure is defined by the curvature of the bending line, the bending line of which the curvature is minimal is determined, for example.

A step 408 is then carried out.

In step 408, the trajectory 106 for contra ng the vehicle 100 is output.

A step 410 is then carried out.

In step 410, a longitudinal guide, i.e. a speed profile with which the trajectory 106 is traversed, is determined. Starting from the regions of maximum curvature of the bending line, the permissible speed profile is calculated, for example. In this case, the permissible maximum speed at each point of the trajectory 106 can be calculated from the curvature and vehicle properties, such as the adhesion coefficient or output. However, it may not be possible to drive at this speed under certain circumstances, e.g. if the acceleration and braking behavior of the vehicle does not permit it.

In this case, provision may be made to choose a different trajectory 106. The trajectory which satisfies the boundary condition and for which the quality measure comes closest to the extremal value is chosen, for example. A different longitudinal profile is driven as a result.

The method then ends.

The bending line can also be determined for a section 108 of the trajectory 106 for driving in a segment 124. In this case, the section start and the section end are defined by nodes of the bending strip which a discrete element of the bending strip connects.

In this case, the course of the section 108 is determined in dependence on a bending line of the discrete element. For this purpose, a quality measure for the discrete element is determined in dependence on a property of the discrete element. For this purpose, the quality measure can be defined as a bending stiffness, a tension or centering of the discrete element with respect to the representation of the roadway boundary. In this case, the bending line of the discrete element for which the quality measure has an extremal value is determined in accordance with the principle of virtual displacement by means of the finite element method.

By means of different properties of the bending strip, it is possible to represent a nonlinear model behavior occurring during driving. For this purpose, a minimal value as an extremal value is defined in dependence on at least one parameter which defines a property of the bending strip 300 or of the discrete element 306 of the bending strip 300 in dependence on an acceleration and/or deceleration behavior of the vehicle 100.

In this case, provision is made to determine a multiplicity of minimal values for various parameters. The trajectory 106 is then determined in dependence on the parameter which defines the smallest minimal value of the multiplicity of minimal values. This means that the trajectory 106 is determined in accordance with the course of the bending line that results from the calculation with this parameter.

In the case of a discrete segment-by-segment calculation, the first discrete element 306 situated in front of the vehicle is initially left unchanged. The vehicle 100 traverses a first segment 124 corresponding to this discrete element 306. When the vehicle 100 arrives at the end of this segment 124, i.e. reaches the end of the corresponding discrete element 306 or rod-type bar, the discrete element 306 traversed is removed from the calculation, and a further discrete element 306 is attached to the end of this bending strip 300. The time to traverse the first segment 124 is thus retained for a new calculation of the trajectory 106.

In both cases, contact conditions on the bending strip can change with each new calculation of the trajectory 106. As a result, the position of the overall bending strip sometimes changes, but the changes are greatest at the end thereof and decrease in the direction of the vehicle 100. With a sufficiently long bending strip, the changes directly in front of the vehicle 100 are negligible.

Sometimes, there may be no guidance or positioning of the bending strip at all over a long straight section, for example. In this case, there is a free choice of vehicle position within the roadway boundaries. In this case, it is advantageous to provide central positioning in the roadway 102 traveled. This centering can be defined as a boundary condition at all or some nodes of the bending strip.

In a curve region, there is the possibility that the bending strip defines a course which gives rise to deliberate contact with the roadway boundary. In this case, the vehicle is brought in the calculation into a desired position for approaching the curve by the properties of the bending strip and the boundary condition.

What is claimed:

1. A method for autonomous driving of a vehicle on a roadway in a direction of travel, said method comprising:
   determining a trajectory for driving on the roadway in the direction of travel based upon a model of a bending strip of limited length that is fixed at one end thereof in a node which defines a starting point of the trajectory;
   determining a course of the trajectory, starting from the starting point, in dependence on a bending line of the bending strip, which bending line extends, starting from the node, to the other end of the bending strip;
   wherein a representation of a roadway boundary defines a boundary condition for the determination of the trajectory;
   defining a quality measure in dependence on a property of the bending strip;
   determining, by a principle of virtual displacement, the bending line which satisfies the boundary condition and for which the quality measure has an extremal value, the extremal value being a minimal value;
   selecting a smallest minimal value from a multiplicity of minimal values that are each determined in dependence on different parameters, each of the different parameters defining a different property of the bending strip or of a discrete element of the bending strip in dependence on at least one of an acceleration or deceleration behavior of the vehicle;
   selecting a parameter of the different parameters which corresponds to the smallest minimal value of the multiplicity of minimal values; and
   determining the trajectory based on the selected parameter.

2. The method as claimed in claim 1, wherein the quality measure is defined by a curvature of the bending line, wherein the bending line of which the curvature is minimal is determined.

3. The method as claimed in claim 1, further comprising determining a section of the trajectory for driving in a segment of the roadway which extends in the direction of travel, wherein the section is bounded by a section start and a section end, wherein the section start and the section end are defined by nodes of the bending strip which the discrete element of the bending strip connects, wherein a course of the section is determined in dependence on a bending line of the discrete element, wherein the quality measure is defined in dependence on a property of the discrete element including a bending stiffness, a tension or centering of the discrete element in respect of the representation of the roadway boundary, wherein the bending line for which the quality measure has an extremal value is determined by the principle of virtual displacement.

4. The method as claimed in claim 3, wherein the discrete element is modeled as a rod-type bar.

5. The method as claimed in claim 4, wherein the boundary condition defines a respective node for the section start and the section end, said nodes representing a point on or within the roadway boundary on a line perpendicular to a median strip.

6. The method as claimed in claim 1, wherein the boundary condition defines at least one property for an element stiffness for the bending strip or the discrete element of the bending strip.

7. The method as claimed in claim 1, wherein an additional spring element is defined for the bending strip or the discrete element of the bending strip, said additional spring element engaging on a node for the bending strip or for the discrete element, wherein the boundary condition defines at least one property of the additional spring element.

8. The method as claimed in claim 1, wherein the determination of the trajectory is started in dependence on a position of the vehicle with respect to a previously determined trajectory, or under time control.

9. The method of claim 1, wherein the principle of virtual displacement is the finite element method.

10. The method of claim 1, wherein the property is one of a bending stiffness, a tension of the bending strip, or centering of the bending strip with respect to the representation of the roadway boundary.

11. A device for autonomous driving of a vehicle on a roadway in a direction of travel, wherein the device comprises a processing unit, a detection unit and an actuating unit, which are configured to interact to carry out the following steps:
  determine a trajectory for driving on the roadway in the direction of travel based upon a model of a bending strip of limited length that is fixed at one end thereof in a node which defines a starting point of the trajectory;
  determine a course of the trajectory, starting from the starting point, in dependence on a bending line of the bending strip, which bending line extends, starting from the node, to the other end of the bending strip;
  wherein a representation of a roadway boundary defines a boundary condition for the determination of the trajectory;
  define a quality measure in dependence on a property of the bending strip;
  determine, by a principle of virtual displacement, the bending line which satisfies the boundary condition and for which the quality measure has an extremal value, the extremal value being a minimal value;
  select a smallest minimal value from a multiplicity of minimal values that are each determined in dependence on different parameters, each of the different parameters defining a different property of the bending strip or of a discrete element of the bending strip in dependence on at least one of an acceleration or deceleration behavior of the vehicle;
  select a parameter of the different parameters which corresponds to the smallest minimal value of the multiplicity of minimal values; and
  determine the trajectory based on the selected parameter.

* * * * *